United States Patent [19]
Vangsness

[11] 3,814,465
[45] June 4, 1974

[54] METER BAR CONSTRUCTION
[76] Inventor: Gordon A. Vangsness, 10209 Pacific Ave., Villa Park, Ill.
[22] Filed: Dec. 22, 1972
[21] Appl. No.: 317,640

[52] U.S. Cl.................................. 285/30, 285/286
[51] Int. Cl............................................. F16l 35/00
[58] Field of Search...... 240/65, 68 R, 317; 285/30, 285/179, 64, 189, 130, 132, 286; 73/201

[56] References Cited
UNITED STATES PATENTS
| | | | |
|---|---|---|---|
| 2,050,339 | 8/1936 | Kidd | 285/286 X |
| 3,003,227 | 10/1961 | Haag | 285/286 X |
| 3,746,371 | 7/1973 | Leopold et al. | 285/30 |

FOREIGN PATENTS OR APPLICATIONS
| | | | |
|---|---|---|---|
| 303,858 | 12/1932 | Italy | 285/30 |
| 640,892 | 12/1936 | Germany | 73/201 |

*Primary Examiner*—Dave W. Arola
*Attorney, Agent, or Firm*—Wolfe, Hubbard, Leydig, Voit & Osann, Ltd.

[57] ABSTRACT

A meter bar assembly formed of a flat elongated plate of metal having a pair of openings spaced to register with the nipples on a gas meter with plumber's elbows being welded to the plate in register with the nipples and oriented to provide threaded inlet and outlet connections facing in different directions. An integral upwardly extending flange is provided along the back edge of the plate and an integral downwardly extending flange is provided along its front edge. In the preferred embodiment the openings in the plate are sized to nestingly receive the flanges on the elbows.

1 Claim, 6 Drawing Figures

PATENTED JUN 4 1974  3,814,465
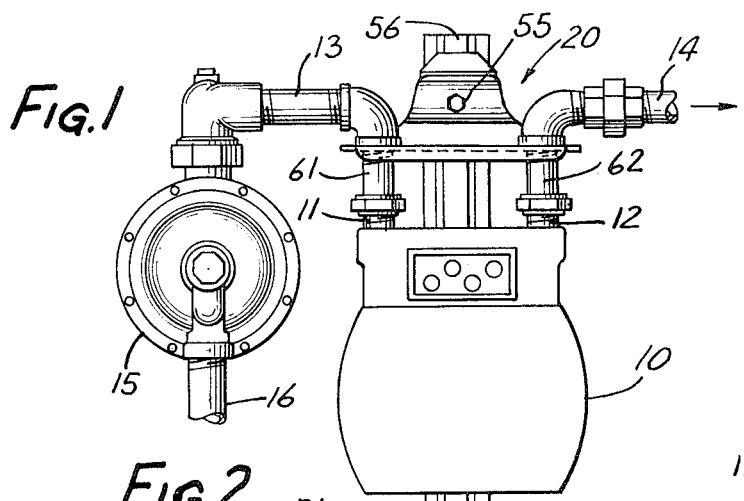
Fig.1
Fig.1a
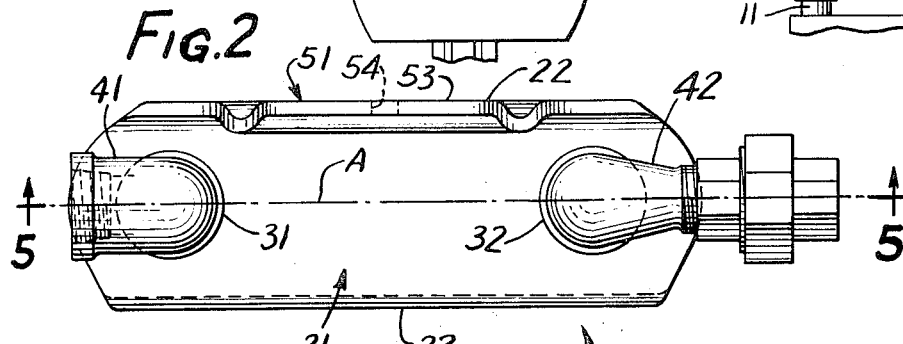
Fig.2
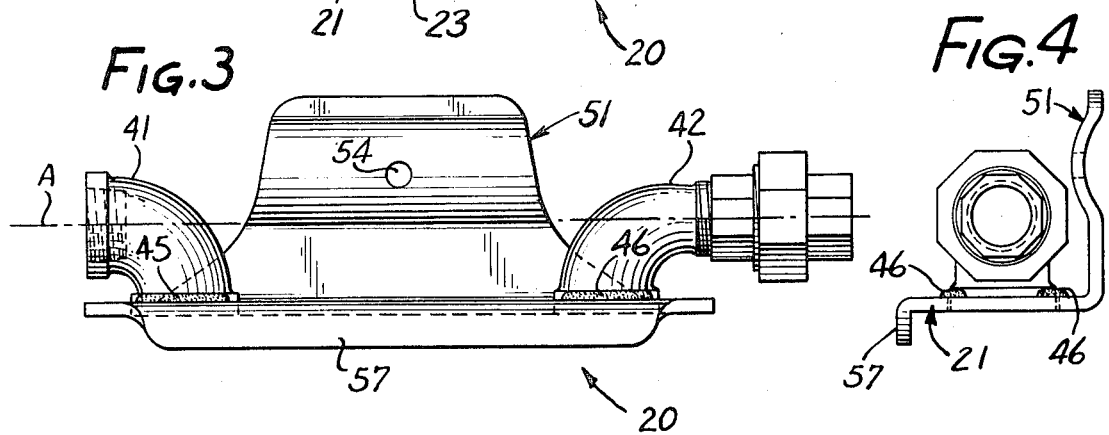
Fig.3
Fig.4
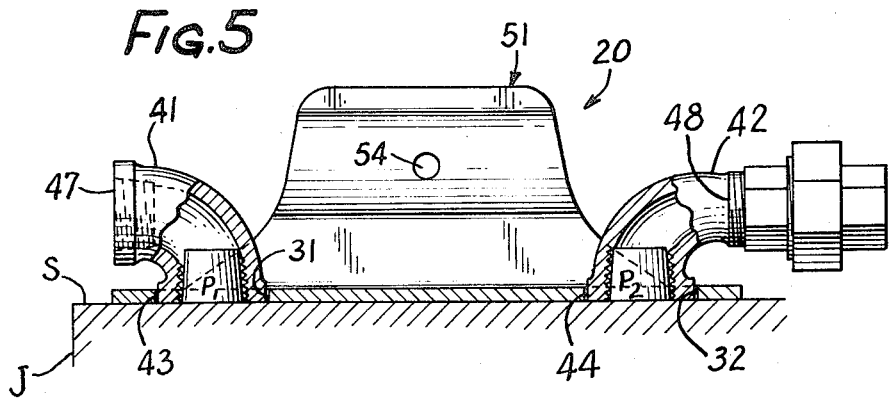
Fig.5

METER BAR CONSTRUCTION

For many years it has been the practice in the plumbing field to mount a gas meter upon a cast iron meter bar. Such meter bars have been relatively expensive and, being a specialized foundry product have, at times, been difficult to obtain. Moreover, because of the variations in the associated plumbing it has been necessary to stock meter bars in a large number of configurations requiring maintenance of a large inventory.

It is an object of the present invention to provide a meter bar which departs from the usual casting and which is made up instead, of a flat metal plate which mounts a pair of plumber's elbows of standard type readily available at competitive prices. It is another object of the present invention to provide a meter bar which can be easily and cheaply constructed of three pieces, a plate and two elbows, tack welded together and which has a strength comparable to that of a conventional cast iron bar but which is substantially lighter and more easily handled and installed. In this connection it is an object to provide a meter bar which, while making use of a relatively thin plate of metal, has great inherent rigidity.

It is another object of the present invention to provide a meter bar which may be easily and quickly assembled to a high degree of accuracy upon a simple type of jig, an accuracy which is greater than that obtained in cast iron meter bars and which permits "straight" swivels to be used for connections to the meter nipples rather than the expensive offset swivels. It is a related object to provide a meter bar assembly which enables different facing of the inlet and outlet connections and substitution of different elbows or equivalent fittings to accommodate different arrangements of environmental plumbing thereby substantially reducing the inventory of parts which need be maintained to fulfill requirements encountered in the field.

Finally, it is an object to provide a meter bar which, although making use of competitively available components nonetheless presents an attractive and integrated appearance denoting a value which greatly exceeds the cost of production.

Other objects and advantages of the invention will become apparent upon reading the attached detailed description and upon reference to the drawings in which:

FIG. 1 is an elevational view of a meter bar supporting a gas meter in operating position.

FIG. 1a is a fragmentary view based upon FIG. 1 but showing use of offset swivels.

FIG. 2 is a top view of the meter bar of FIG. 1.

FIG. 3 is a front view of the meter bar corresponding to FIG. 2.

FIG. 4 is a right-hand end view.

FIG. 5 is a sectional view looking along the line 5—5 in FIG. 2 and showing the plate and elbows assembled upon a jig.

While the invention has been described in connection with a preferred embodiment, it will be understood that I do not intend to be limited to the particular embodiment shown but intend, on the contrary, to cover the various alternative and equivalent forms of the invention which may be included within the spirit and scope of the appended claims.

Turning now to the drawing there is disclosed in FIG. 1 a typical set-up including a gas meter 10 having a pair of horizontally spaced upwardly projecting nipples 11, 12. The meter is connected between an inlet line 13 and an outlet line 14. The inlet line includes a pressure reducing and regulating valve 15 which is fed from a relatively high pressure source of gas 16. The outlet line 14 leads to the usual domestic gas distribution system within a home or other establishment.

In accordance with the present invention a meter bar is provided made up of a flat elongated plate of metal having a pair of openings spaced to register with the nipples on the gas meter and mounting a pair of plumber's elbows welded in register with the openings, the openings providing downwardly facing nipple connections and being oriented to present threaded inlet and outlet connections facing in different directions for connection to the associated runs of plumbing. Thus referring to the drawing, the meter bar, indicated at 20, is made up of a flat relatively thin plate of metal 21 having a rear edge 22 and a front edge 23. The plate has formed therein, preferably by punching, first and second openings 31, 32 the centers of which are spaced to coincide with the spacing of the nipples 11, 12 on the meter. Mounted upon the plate 21 is a first plumber's elbow 41 and a second plumber's elbow 42. These elbows are of conventional type readily available in the market at competitive prices and having the usual flanges 43, 44.

In accordance with one of the aspects of the present invention the openings 31, 32 are of such diameter as to accommodate the flanges 43, 44 so that the elbows may be tack welded to the plate in telescoped or nested position as shown in FIG. 5, the welding being indicated at 45, 46 respectively.

For connecting the meter bar to the associated plumbing, the elbow 41 has a female threaded connection 47 while the elbow 42 may be provided with a male threaded connection 48. These threaded connections face in different directions and, in a common configuration, are oppositely facing but in alinement with one another along an axis indicated at A in FIGS. 2 and 3.

In order to insure the desired axial spacing between the downwardly facing nipple connections, the three pieces which make up the meter bar assembly are assembled in a jig J having an upper surface S and which presents a pair of upwardly projecting tapered posts or plugs P1, P2. The plate 21 is first seated upon the surface S with the plugs P1, P2 approximately centered within the openings 31, 32. The elbows 41, 42 are then seated upon the plugs with the inlet and outlet connections 47, 48 facing in desired different directions for example oppositely to one another. In order to permit compensation for minor variations in the diameters of the openings 31, 32 and flanges 43, 44 as well as non-concentricity of the threads within the flanges, the openings are preferably made of slightly larger diameter than the nominal diameter of the flanges. The diametrical difference may be on the order of one thirty-second inch. With the parts assembled as shown in FIG. 5 it is a simple matter to tack weld the flanges to the presented edges of the openings 31, 32. Tack welding of the nested joint requires no skill or judgment.

Since the welding may be of the "tack" variety and quickly performed upon parts initially at room temperature, there is no jeopardy to the plugs P1, P2 which may be made of nylon or other durable plastic.

The jig J, in addition to providing the desired axial spacing, provides a reference surface for the flanges on the elbows so that the lower edges of the flanges will be substantially flush with the lower surface of the plate 21; in other words, the elbows are "fully inserted" into the plate for maximum strength of the completed assembly, as well as causing the assembly to look integrated and workmanlike. While it is possible, without departing from the invention, to seat the elbows on top of, rather than within, the plate 21, the preferred structure has been illustrated.

It is one of the features of the present invention that an integral upwardly extending flange is provided along the rear edge of the plate 21 having provision for mounting to a vertical supporting surface. Such flange, indicated at 51, is preferably of "near trapezoidal" profile having a base which may extend substantially the length of the plate 21 and presenting a vertical mounting surface 53 having a central hole 54. The hole 54 accommodates a mounting bolt 55 which may, as shown, engage a vertical mounting post 56 or which may be screwed into a suitable fitting provided in the wall of a building or similar flat supporting structure.

Extending along the front edge of the plate 21 is a downwardly extending integral flange 57 (see especially FIG. 4). The two flanges 51, 57, taken together, provide reinforcement for the horizontal plate 21, rigidifying the plate so that it is substantially as strong and rigid as the more massive cast iron meter bars which have been employed in the past.

It is found that constructing a meter bar as described results in a higher degree of accuracy in the axis-to-axis spacing of the nipple connections than has been possible in the conventional cast iron bars. The reason for this is that with the threads having been pre-cut in the elbows, accurate center-to-center spacing is automatically established simply by slipping the elbows over the tapered plugs P1, P2. Accuracy on the order of thousandths of an inch may be obtained without care or expense. By contrast, it is much more difficult to tap holes in a casting with an accurate center-to-center distance. The tap tends to aline itself with the openings in the rough casting and the center-to-center distance of such openings is subject to variation.

As a result of the inherent accuracy of spacing and parallelism, the nipples 11, 12 on the meter may be connected to the elbows by simple "straight" swivels, such as indicated at 61, 62, rather than by the "offset" swivels which are usually required. This enables an economy since the "straight" swivels are more cheaply obtained in the market than the "offset" swivels. Nevertheless, it is one of the features of the construction that offset swivels may be used if desired in order to accommodate the present meter bar construction to meters having a non-standard nipple spacing as is shown at 63, 64 in FIG. 1a.

I claim:

1. A meter bar for mounting a gas meter having a pair of horizontally spaced upwardly projecting nipples comprising, in combination, a flat elongated plate horizontally arranged and having a pair of openings spaced to register with the nipples, plumber's elbows having flanges, the openings being of such diameter as to nestingly accommodate the flanges, with the lower end surfaces of the flanges being substantially flush with the lower surface of the plate, the elbows providing parallel downwardly facing nipple connections and being oriented to present threaded inlet and outlet connections in alinement and facing in opposite directions, the flanges of the elbows being welded to the edges of the openings, the plate having a vertically extending back portion integral with the plate including provision for mounting upon a vertical surface and serving to impart rigidity to the plate to maintain the nipple connections in parallel relation.

* * * * *